(12) United States Patent
Motowaki

(10) Patent No.: US 11,034,528 B2
(45) Date of Patent: Jun. 15, 2021

(54) WORKPIECE HOLDING JIG

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 58 days.

(21) Appl. No.: 16/215,862

(22) Filed: Dec. 11, 2018

(65) Prior Publication Data

US 2019/0193949 A1 Jun. 27, 2019

(30) Foreign Application Priority Data

Dec. 22, 2017 (JP) .............................. JP2017-246517

(51) Int. Cl.
| | | |
|---|---|---|
| *B23Q 7/00* | (2006.01) | |
| *B65G 47/26* | (2006.01) | |
| *B25B 5/02* | (2006.01) | |
| *B25B 11/00* | (2006.01) | |
| *B25B 5/00* | (2006.01) | |

(Continued)

(52) U.S. Cl.
CPC ........... *B65G 47/26* (2013.01); *B23Q 7/1436* (2013.01); *B25B 5/003* (2013.01); *B25B 5/02* (2013.01); *B25B 11/00* (2013.01); *B65G 47/90* (2013.01); *B25J 15/0253* (2013.01); *B65G 2201/02* (2013.01)

(58) Field of Classification Search
CPC .. B25B 5/003; B25B 5/02; B25B 5/04; B25B 5/14; B25B 11/00; B65G 47/26; B23Q 7/1436
See application file for complete search history.

(56) References Cited

U.S. PATENT DOCUMENTS

| | | | |
|---|---|---|---|
| 4,890,371 A | 1/1990 | Camloh et al. | |
| 4,915,367 A * | 4/1990 | Carossino ................. | B25B 1/08 269/101 |

(Continued)

FOREIGN PATENT DOCUMENTS

| | | | |
|---|---|---|---|
| DE | 102018200018 A1 * | 12/2018 | |
| JP | S61-252029 A | 11/1986 | |

(Continued)

OTHER PUBLICATIONS

Japanese Office Action dated Dec. 17, 2019, in connection with corresponding JP Application No. 2017-246517 (7 pgs., including machine-generated English translation).

(Continued)

*Primary Examiner* — Lee D Wilson

(74) *Attorney, Agent, or Firm* — Maier & Maier, PLLC

(57) ABSTRACT

A workpiece holding jig including a base member conveyed by a linear guide and at least one pair of holding pieces arranged on the base member in the direction crossing the conveying direction of the linear guide. Each of the at least one pair of holding pieces includes a workpiece holding portion that fits or contacts with the outer peripheral surface of a workpiece located between the at least one pair of holding pieces to prevent the workpiece from slanting or becoming misaligned during the conveyance. At least one of holding pieces in the at least one pair of holding pieces is movable in the direction away from the other.

4 Claims, 12 Drawing Sheets

(51) Int. Cl.
*B23Q 7/14* (2006.01)
*B65G 47/90* (2006.01)
*B25J 15/02* (2006.01)

(56) References Cited

U.S. PATENT DOCUMENTS

| | | | | |
|---|---|---|---|---|
| 4,958,813 | A * | 9/1990 | Dykstra | B25B 5/061 |
| | | | | 269/234 |
| 5,060,920 | A * | 10/1991 | Engibarov | B25B 1/241 |
| | | | | 269/282 |
| 5,499,802 | A * | 3/1996 | Haberle | B23Q 3/102 |
| | | | | 269/235 |
| 5,816,568 | A * | 10/1998 | Fox | B25B 5/14 |
| | | | | 269/60 |
| 6,000,688 | A * | 12/1999 | Giangrasso | B23Q 3/104 |
| | | | | 269/252 |
| 6,113,088 | A * | 9/2000 | Gakhar | B25B 5/105 |
| | | | | 269/139 |
| 6,152,435 | A * | 11/2000 | Snell | B25B 1/20 |
| | | | | 269/268 |
| 2016/0107278 | A1 * | 4/2016 | Liao | B23Q 3/061 |
| | | | | 269/43 |
| 2019/0193949 | A1 * | 6/2019 | Motowaki | B65G 47/26 |

FOREIGN PATENT DOCUMENTS

| | | |
|---|---|---|
| JP | H08-197474 A | 8/1996 |
| JP | H10-7178 A | 1/1998 |
| JP | H10-157825 A | 6/1998 |
| JP | 2001-097474 A | 4/2001 |
| JP | 2004-009200 A | 1/2004 |
| JP | 2006-273347 A | 10/2006 |
| JP | 2009-269123 A | 11/2009 |
| JP | 2012/197175 A | 10/2012 |
| JP | 2014-091614 A | 5/2014 |
| JP | 2016-196071 A | 11/2016 |

OTHER PUBLICATIONS

Japanese Search Report dated Dec. 6, 2019, in connection with corresponding to JP Application No. 2017-246517 (31 pgs., including machine-generated English translation).

* cited by examiner

WORKPIECE HOLDING JIG

CROSS-REFERENCE TO RELATED APPLICATIONS

This application is based on and claims priority to Japanese Patent Application No. 2017-246517 filed on Dec. 22, 2017, the entire content of which is incorporated herein by reference.

FIELD

The present invention relates to a workpiece holding jig.

BACKGROUND

Jigs that hold workpieces have been known in the art (e.g., refer to Japanese Unexamined Patent Application, Publication No. H10-157825). Such a jig includes an elongate tray on which a plurality of bolts as workpieces are arranged in a predetermined direction, magnets provided at the positions of the bolts on the tray and preventing the bolts on the tray from slanting, and a pair of grasp members provided above the tray and configured to grasp the threads of the bolts arranged in the predetermined direction. The grasp members move the plurality of bolts gradually in the predetermined direction.

SUMMARY

A first aspect of the present invention is a workpiece holding jig conveyed by a conveyor in a predetermined direction, the workpiece holding jig comprising: a base member; and a pair of holding pieces arranged on the base member in a direction crossing the predetermined direction, wherein each of the pair of holding pieces includes a workpiece holding portion that fits or contacts with an outer peripheral surface of a workpiece located between the pair of holding pieces to prevent the workpiece from slanting or becoming misaligned during conveyance in the predetermined direction, and at least one of the pair of holding pieces is movable in a direction away from the other.

A second aspect of the present invention is a workpiece holding jig conveyed by a conveyor in a predetermined direction, the workpiece holding jig comprising: a base member; a workpiece holding hole provided in the base member; and an upward extension portion extending upward from near the workpiece holding hole, wherein the upward extension portion align, in the predetermined direction, with a workpiece held by the workpiece holding hole, and the workpiece holding hole and the upward extension fit or contact with an outer peripheral surface of the held workpiece to prevent the workpiece from slanting or becoming misaligned during conveyance in the predetermined direction.

DETAILED DESCRIPTION

A workpiece holding jig 1 according to a first embodiment of the present invention and a manufacturing system 100 including the same will now be described with reference to the drawings.

Figure 2:
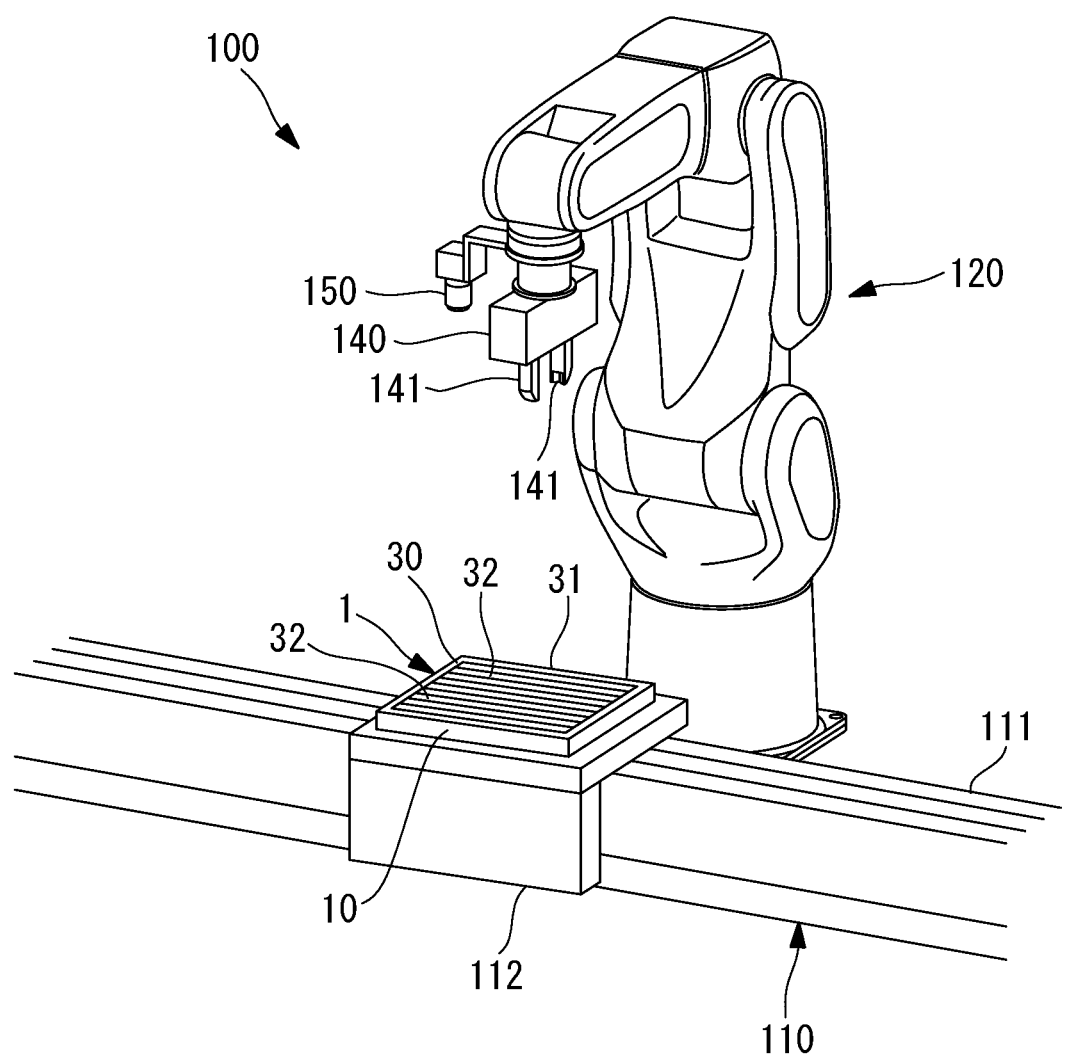
FIG. 2 is a schematic perspective view of the workpiece holding jig according to the first embodiment and a manufacturing system including the workpiece holding jig.
Figure 3:
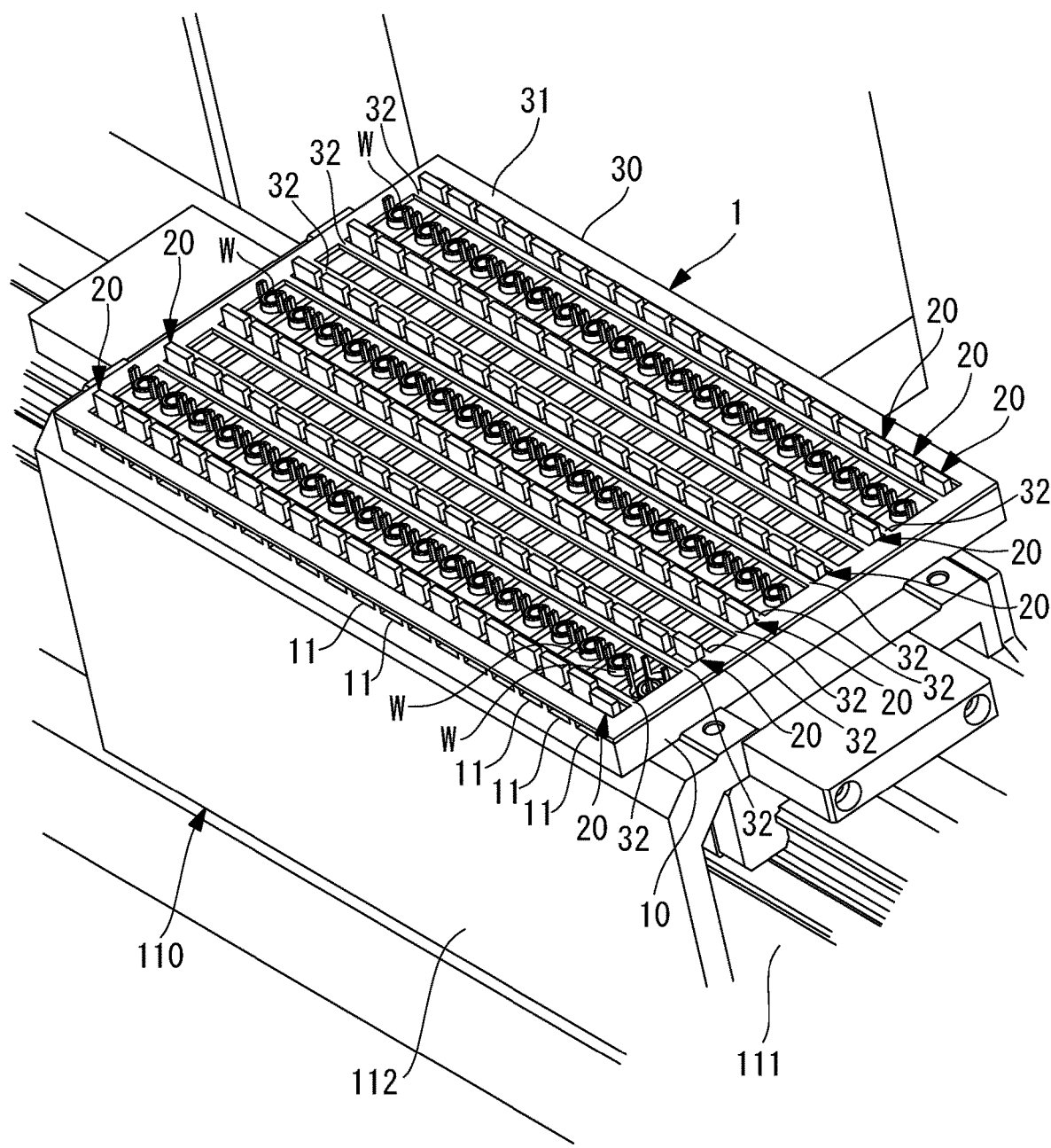
FIG. 3 is a schematic perspective view of the workpiece holding jig according to the first embodiment and a linear guide.

The workpiece holding jig 1 is, as shown in FIGS. 2 and 3, fixed to a slide table 112 of a linear guide (conveyor) 110 included in the manufacturing system 100. The linear guide 110 has a well-known structure and includes a rail 111 and the slide table 112 which is supported by the rail 111 and which is movable in a predetermined direction along the rail 111. The linear guide 110 also has a driving mechanism which drives the slide table 112 in the direction along the rail 111 and which includes a motor and a ball screw (not shown).

The manufacturing system 100 also includes a robot 120 that picks a workpiece W from the workpiece holding jig 1 on the slide table 112 for the linear guide 110 to make a predetermined device.

The robot 120 includes a plurality of movable members and a plurality of servomotors 121 that drive the movable members, respectively. The servomotors 121 are controlled by a control apparatus 130 described later (refer to FIG. 9). The servomotors 121 may be various servomotors such as rotational motors and linear motors.

Each servomotor 121 has an operating position detector such as an encoder that detects the operating position of the servomotor. The operating position detectors transmit detected values to the control apparatus 130, and the detection values are used for the control of the servomotors 121 by the control apparatus 130.

The robot 120 has a hand 140 at its distal end. The hand 140 includes a plurality of claws 141 and grasps a workpiece W with the claws 141. In addition, the robot 120 has a visual sensor 150 at its distal end, and visual information obtained by the visual sensor 150 is transmitted to the control apparatus 130.

Figure 9:
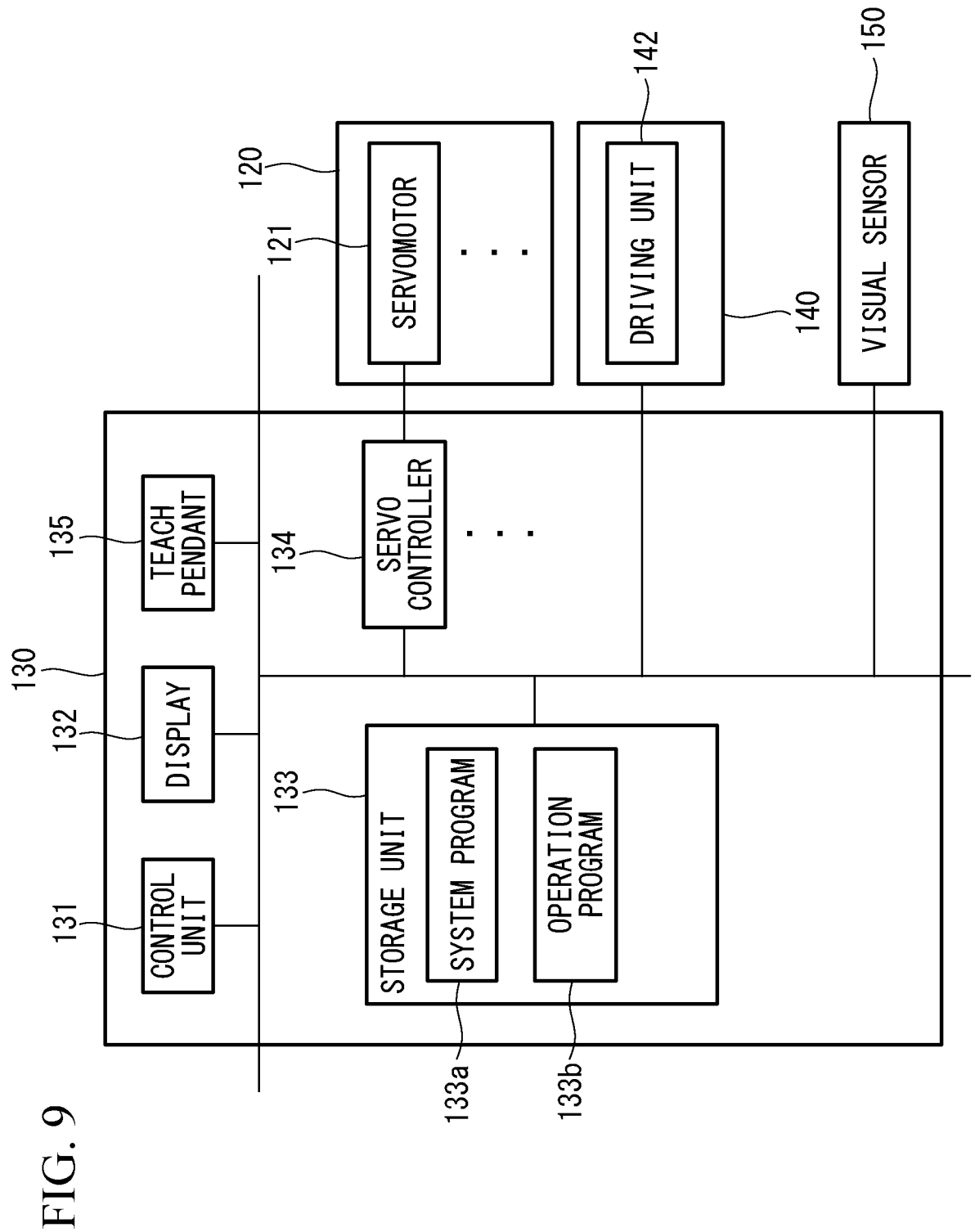
FIG. 9 is a block diagram of a control apparatus according to the first embodiment.

The control apparatus 130 includes a control unit 131 that has, for example, a CPU and RAM, a display 132, a storage unit 133 that has non-volatile memory, ROM, and other memory, a teach pendant 135 operated to create an operation program for the robot 120, and a plurality of servo controllers 134 for the respective servomotors 121 of the robot 120 (refer to FIG. 9).

The storage unit 133 stores a system program 133a. The system program 133a is responsible for basic functions of the control apparatus 130. The storage unit 133 also stores at least one operation program 133b created using, for example, the teach pendant 135.

For example, the control unit 131, which operates based on the system program 133a, reads out the operation program 133b stored in the storage unit 133 and temporarily stores it into the RAM. Based on the read operation program 133b, the control unit 131 sends a control signal to each servo controller 134, thereby controlling the servo amplifiers for the servomotors 121 to control the robot 120. The control unit 131 also sends a control signal to a driving unit 142 such as a motor that drives the claws 141 of the hand 140 provided at the distal end of the robot 120 to control the hand 140.

While adjusting the target position to be reached by the claws 141 of the hand 140 based on the visual information obtained by the visual sensor 150, the control unit 131 sends control signal s to the servo controllers 134 and the driving unit 142 based on the operation program 133b.

In the present embodiment, the linear guide 110 conveys the workpiece holding jig 1 from the workpiece supply position at which cylindrical workpieces W are supplied to the picking position at which the robot 120 picks workpieces W. The control unit 131, which also operates based on the operation program 133b, sends control signals to the servo controllers 134 and the driving unit 142 for the hand 140 of the robot 120 to grasp workpieces W on the workpiece holding jig 1 at the picking position and attach the grasped workpieces W to predetermined positions of the device to be made, by insertion or the like.

The workpiece holding jig 1, as shown in FIGS. 1 to 4, includes a base member 10 made of metal, plastic, or the like and fixed to the slide table 112, and pairs of holding pieces 20 made of metal, plastic, or the like and provided on the base member 10. The base member 10 includes a plurality of guides 11 extending in a direction that is, for example, perpendicular to the conveying direction in which the linear guide 110 conveys the slide table 112. In the description below, the conveying direction in which the linear guide 110 conveys the slide table 112 may be simply referred to as the conveying direction, and the direction that crosses the conveying direction may be simply referred to as the direction crossing the conveying direction. In the present embodiment, the direction crossing the conveying direction is the direction orthogonal (or at an angle of 90°) to the conveying direction. In the present embodiment, each guide 11 is a groove that is rectangular in cross section, and the individual guides 11 are arranged in the conveying direction.

At least a lower part of each holding piece 20 fits in the corresponding guide 11. Each holding piece 20 is rectangular in cross section, and the dimension of each holding piece 20 in the conveying direction is slightly smaller than the dimension of the corresponding guide 11 in the conveying direction. For example, the dimension of each holding piece 20 in the conveying direction and the dimension of the corresponding guide 11 in the conveying direction have a small difference, which is 0.2 mm or less. More preferably, the dimensional difference is 0.15 mm or less.

Each holding piece 20 includes a piece base 21 with at least its lower part fitted in the guide 11, an operation portion 22 extending upward from the piece base 21 at one end thereof in the direction crossing the conveying direction, and an arc holding recess 23 provided in the piece base 21 at the other end in the direction crossing the conveying direction. In the present embodiment, the holding recess 23 is shaped to fit the outer peripheral surface of corresponding workpiece W.

Each holding piece 20 includes a pair of upward extensions 24 extending upward from the piece base 21 at the other end thereof in the direction crossing the conveying direction. Each holding piece 20 has a pair of upward extensions 24 arranged in the conveying direction, and a part of each upward extension 24 is aligned with the inner peripheral surface of the holding recess 23. In the present embodiment, a partial surface of each upward extension 24 is connected with the inner peripheral surface of the holding recess 23 and extends upward.

A pair of holding pieces 20 is arranged so that the holding recesses 23 thereof face each other. Thus, when a workpiece W is placed between a pair of holding pieces 20 and the holding pieces 20 are brought closer to each other, the holding recesses 23 of the pair of holding pieces 20 hold at least the lower end portion of the workpiece W. A cylindrical workpiece W may have a small axial dimension like the front workpieces W in FIGS. 1 and 4, that is, a workpiece W in a position held by the holding recesses 23 may be low. In this case, the holding recesses 23 of a pair of holding pieces 20 fit or contact with the outer peripheral surface of the workpiece W, and thereby the entire workpiece W is held by the holding recesses 23.

Figure 1:
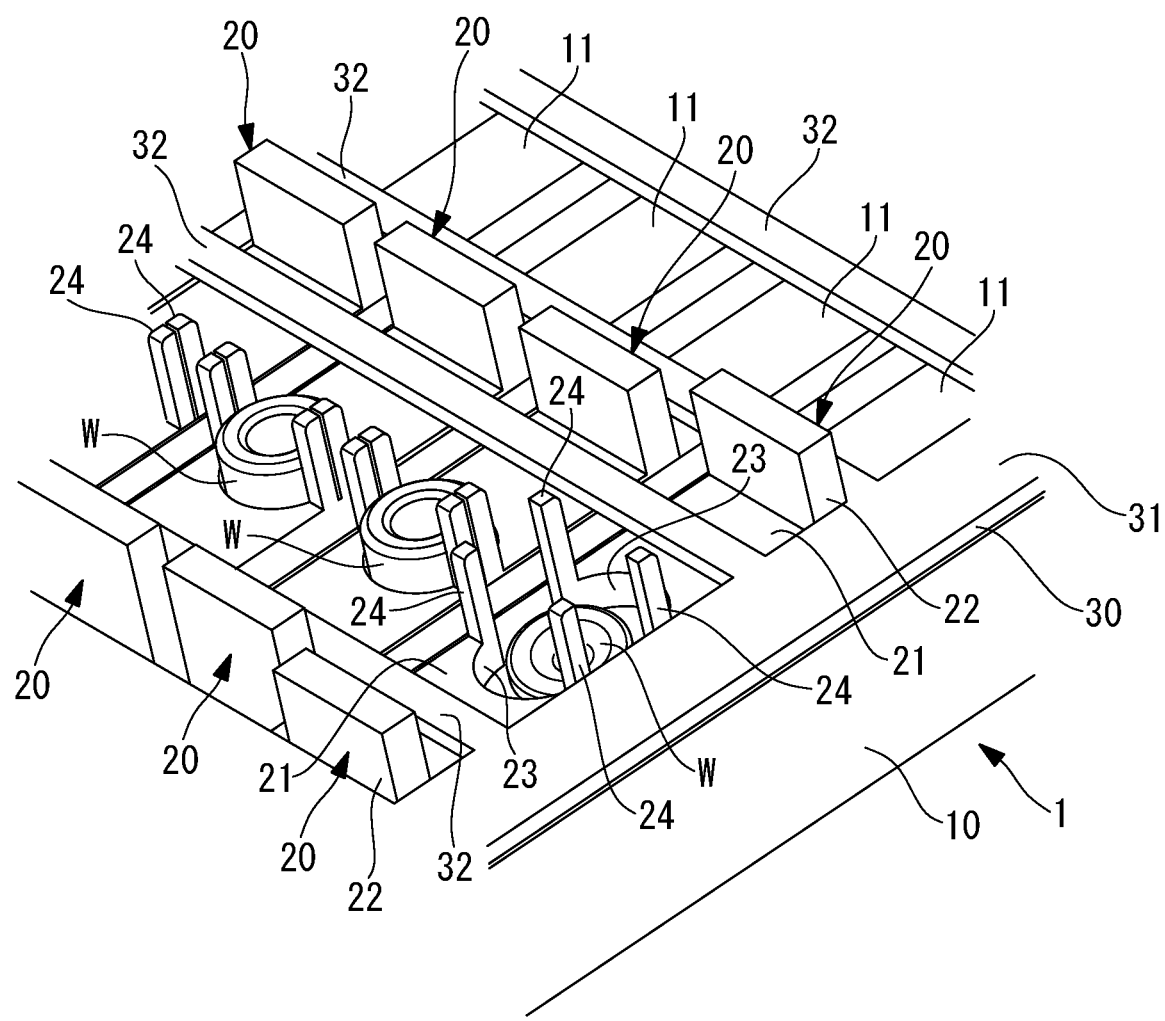
FIG. 1 is a perspective view of a main part of a workpiece holding jig according to a first embodiment of the present invention.
Figure 4:
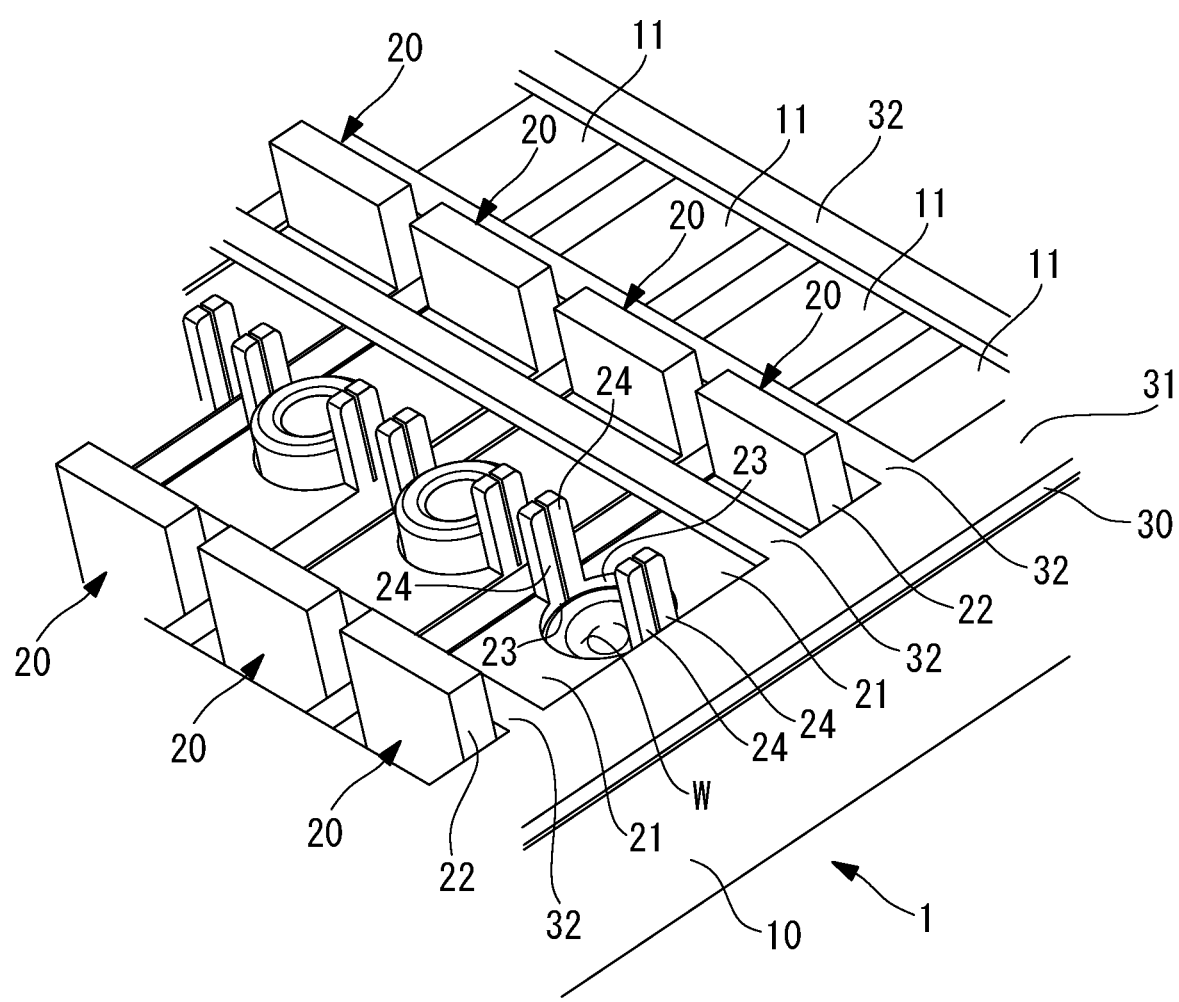
FIG. 4 is a perspective view of a main part of the workpiece holding jig according to the first embodiment.

In contrast, a cylindrical workpiece W may have a large axial dimension like the other workpieces W in FIGS. 1 and 4, that is, a workpiece W in a posture held by the holding recesses 23 may be high. In this case, the holding recesses 23 of a pair of holding pieces 20 fit or contact with the outer peripheral surface of the lower end portion of the workpiece W, and thereby the lower end portion of the workpiece W is held by the holding recesses 23, while the upper end of the workpiece W is held by the pair of upward extensions 24 on each holding piece 20.

A pair of holding pieces 20 may hold a workpiece W with the pair of holding pieces 20 in contact with each other in the direction crossing the conveying direction. In this case, for example, the holding recesses 23 and the upward extensions 24 of the pair of holding pieces 20 are arranged to fit the workpiece W, and thereby the workpiece W is held by the pair of holding pieces 20. In contrast, with a pair of holding pieces 20 out of contact with each other in the direction crossing the conveying direction, the holding recesses 23 and the upward extensions 24 of the pair of holding pieces 20 may come into contact with the outer peripheral surface of a workpiece W, and thereby the workpiece W may be held by the pair of holding pieces 20.

In this manner, the holding recesses 23 and the upward extensions 24 function as a workpiece holding portion that holds a workpiece W.

Each workpiece W is held by a pair of holding pieces 20 in this manner, and thus the workpiece W is prevented from slanting or becoming misaligned when the linear guide 110 conveys the workpiece holding jig 1 in the conveying direction.

In the present embodiment, each guide 11 has multiple pairs of holding pieces 20, and thus each guide 11 receives a plurality of workpieces W.

Figure 8:
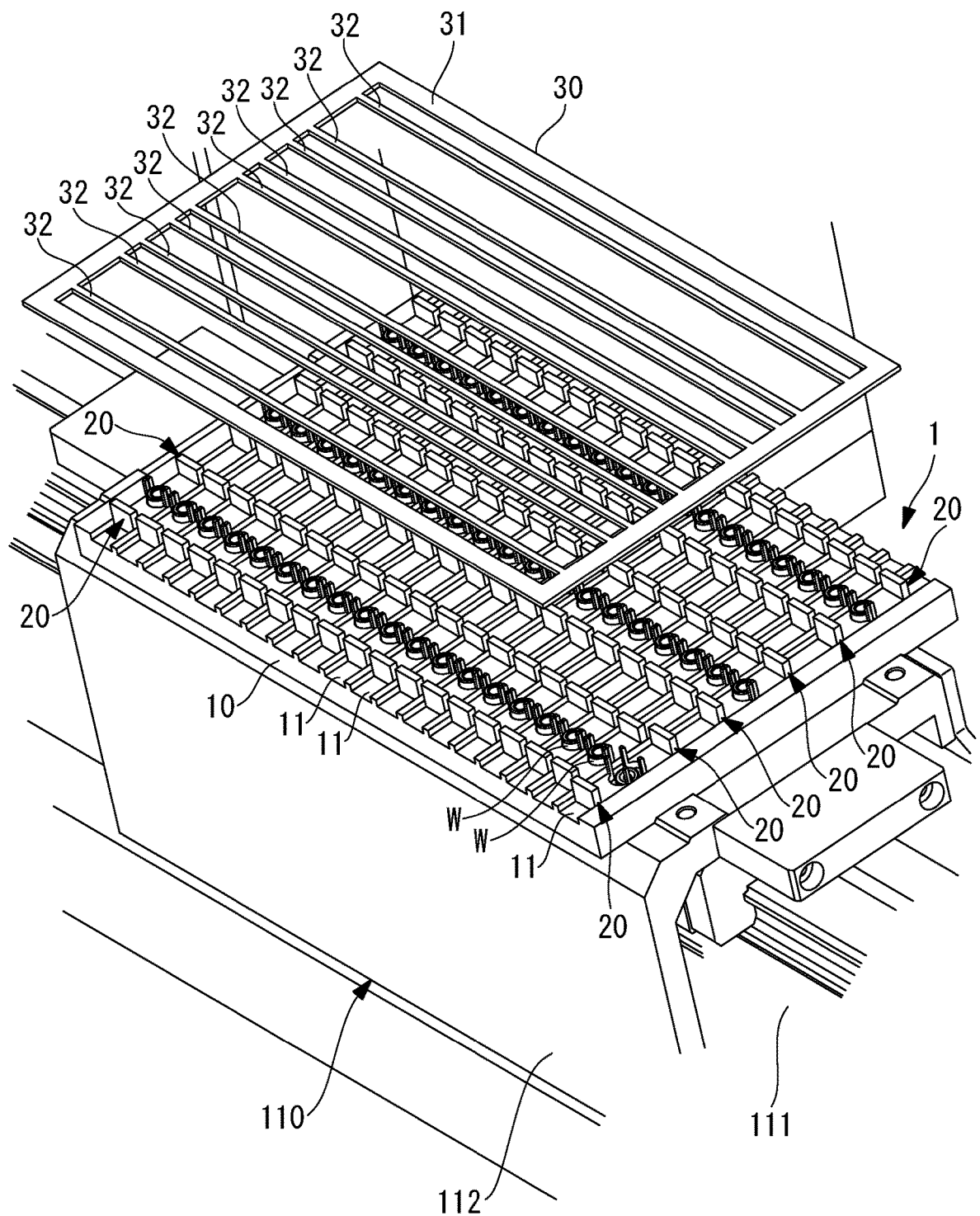
FIG. 8 is a schematic perspective view of the workpiece holding jig according to the first embodiment with its frame member removed.

The workpiece holding jig 1, as shown in FIG. 8, includes a frame member 30 secured on the top surface of the base member 10 by bolts or the like (not shown). The frame member 30 includes a rectangular frame body 31 extending along the edges of the top surface of the base member 10, and a plurality of beam members (piece movement limitation members) 32 laid between both of the frames of the frame body 31 in the conveying direction. The beam members 32 are spaced from each other in the direction crossing the conveying direction.

Figure 7:
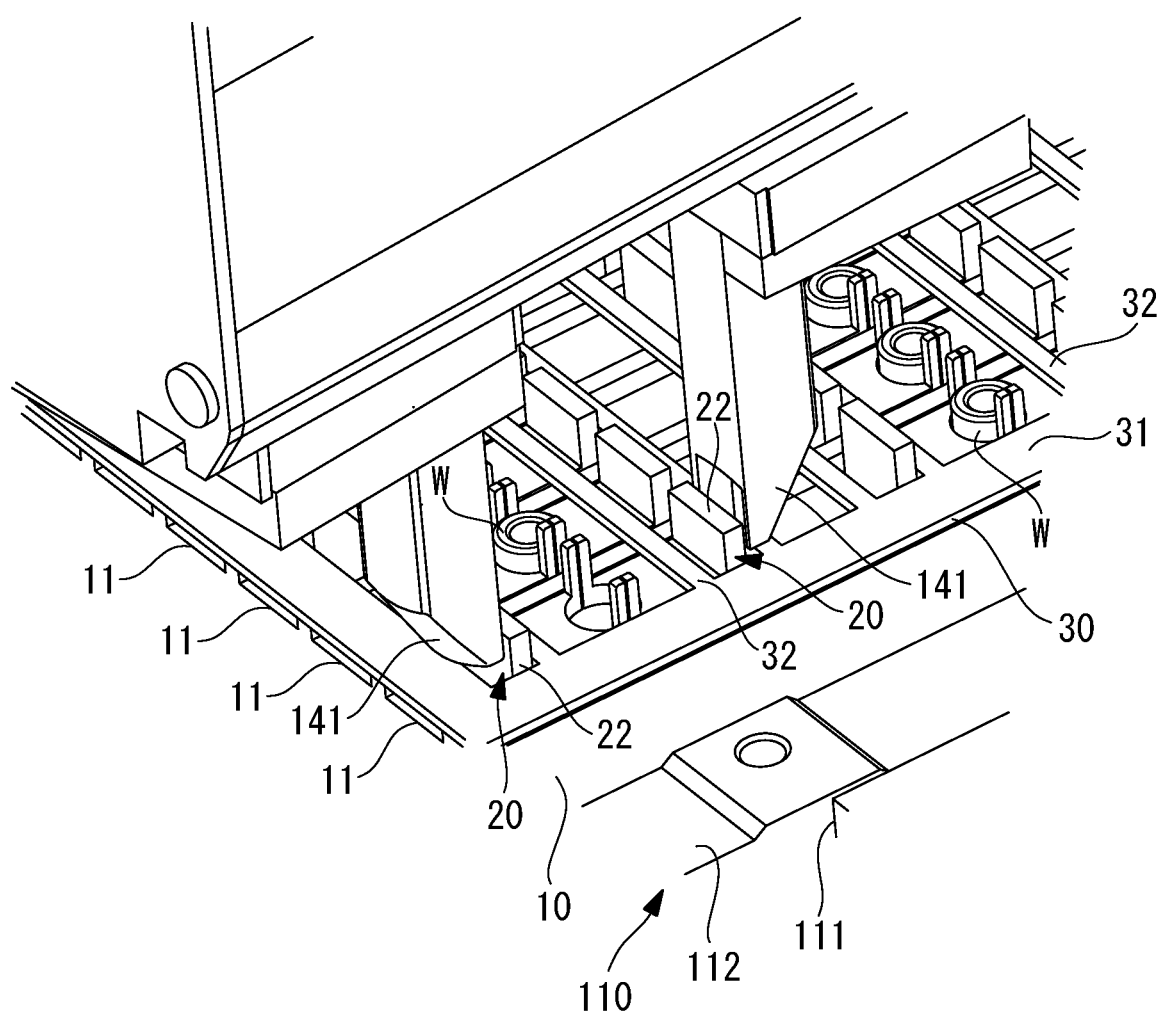
FIG. 7 illustrates an operation of the workpiece holding jig according to the first embodiment.

Each beam member 32 is, as shown in FIGS. 3 and 7, provided to come into contact, in the direction crossing the conveying direction, with the operation portion 22 of one of the holding pieces 20 fitted in each guide 11. As a result, the range of movement of each of the holding pieces 20 along the guide 11 is limited by the corresponding beam member 32. In the present embodiment, as shown in FIG. 3, the range of movement of the operation portions 22 arranged at each end in the direction crossing the conveying direction is limited by one corresponding beam member 32, whereas the range of movement of the other operation portions 22 is limited by the respective two corresponding beam members 32.

An example of the operation of the manufacturing system 100 with this structure will now be described. First, with the workpiece holding jig 1 placed at the workpiece supply position by the linear guide 110, workpieces W are arranged in the workpiece holding jig 1 as shown in, for example, FIG. 3.

Then, as shown in FIG. 2, the workpiece holding jig 1 is conveyed to the picking position by the linear guide 110 in order that the hand 140 of the robot 120 picks the workpieces W.

In this state, to shorten the manufacturing cycle time, the linear guide 110 may be moved from the workpiece supply position to the picking position at high speed. Also in such a case, each workpiece W is held by the holding recesses 23 and the upward extensions 24, and thus the workpiece W is prevented from slanting or becoming misaligned.

When the workpiece holding jig 1 is conveyed to the picking position, the control unit 131 sends control signals to each servo controllers 134 and the driving unit 142 based on the visual information obtained by the visual sensor 150 and the operation program 133*b*. As a result, the robot 120 uses the claws 141 of the hand 140 to pick one workpiece W after another from the workpiece holding jig 1 and attach the taken workpieces W to the device to be made, by insertion or the like.

The operation of the robot 120 and the hand 140 differs between the case of taking out the front workpiece W in FIG. 4, in which the entire of which is held by the holding recesses 23 of the pair of holding pieces 20, and the case of taking out another workpiece W in FIG. 4, in which the lower end portion of which is held by the holding recesses 23 of the pair of holding pieces 20.

Figure 5:
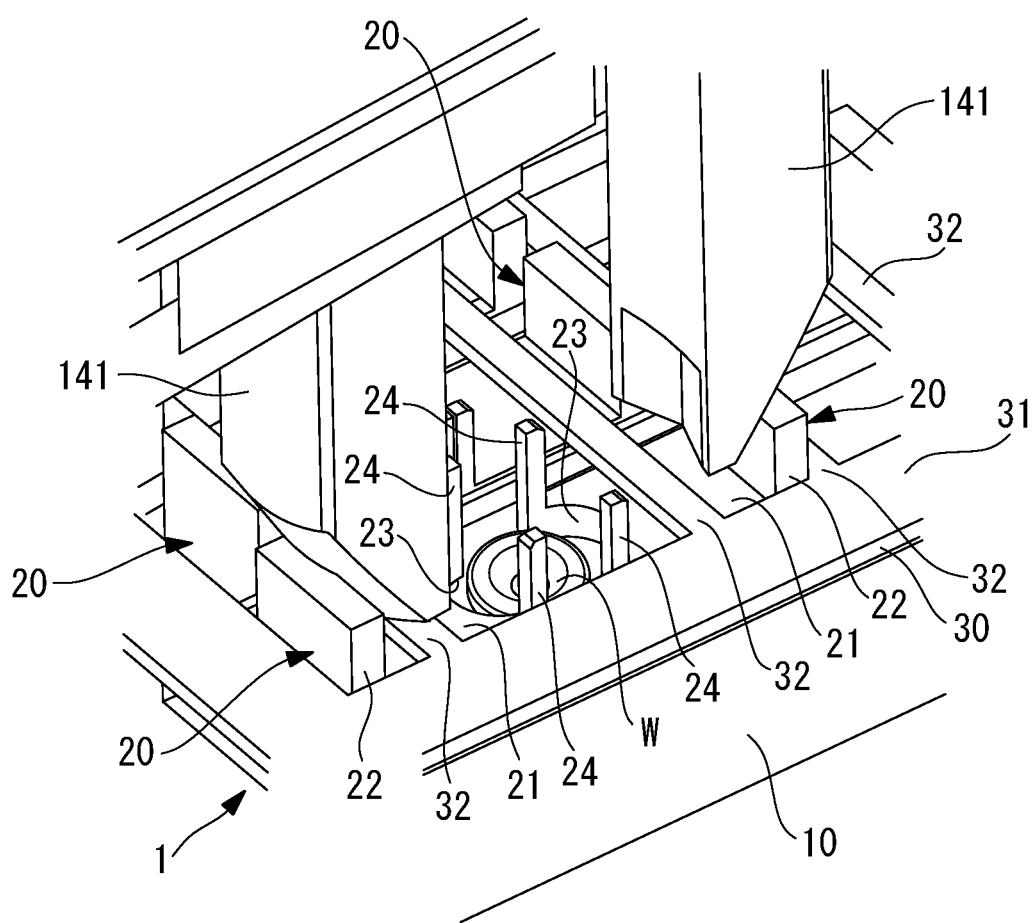
FIG. 5 illustrates an operation of the workpiece holding jig according to the first embodiment.

To pick the front workpiece W in FIG. 4, first, as shown in FIG. 5, the control unit 131 controls the robot 120 and the hand 140 in a manner in which the hand 140 moves the pair of holding pieces 20 away from each other in the directions crossing the conveying direction. For example, the pair of claws 141 of the hand 140 is inserted between the operation portions 22 of the pair of holding pieces 20 in the direction crossing the conveying direction, and the space between the pair of claws 141 is widened. The widening moves the pair of holding pieces 20 away from each other in the directions crossing the conveying direction.

Figure 6:
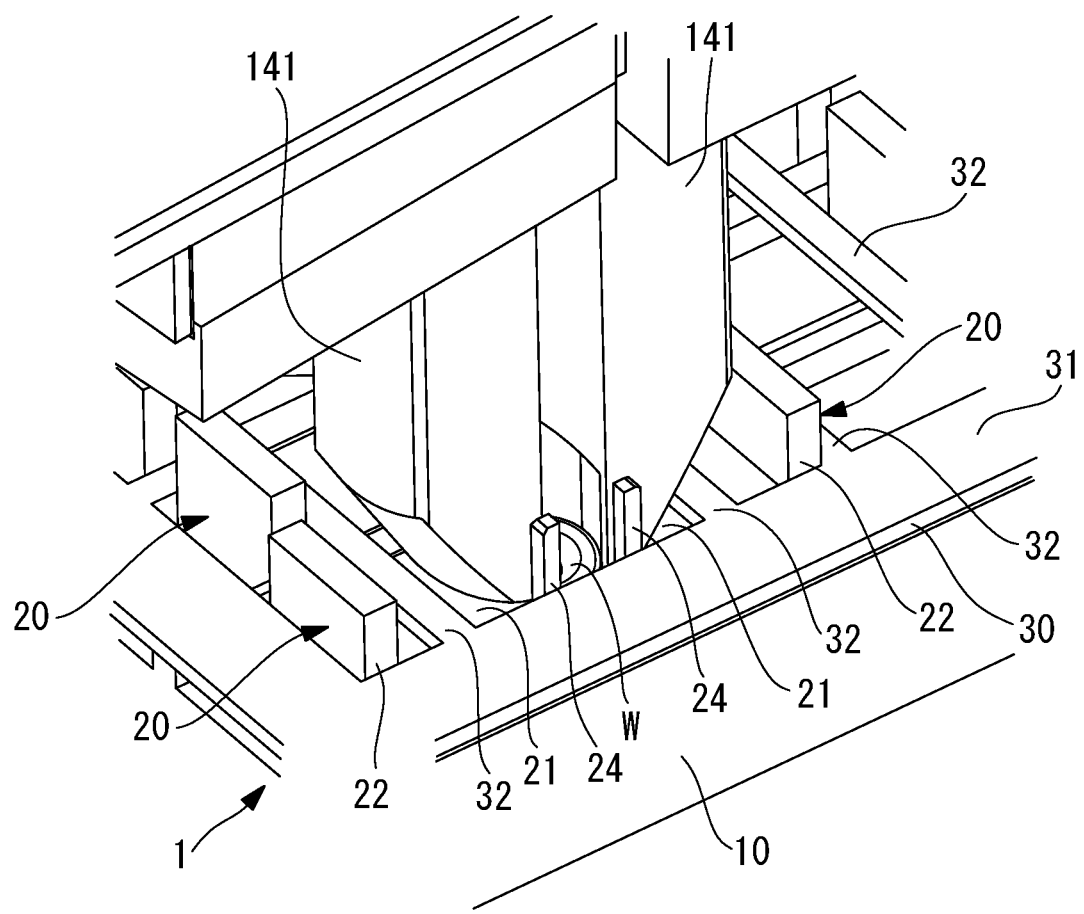
FIG. 6 illustrates an operation of the workpiece holding jig according to the first embodiment.

Next, as shown in FIG. 6, the control unit 131 controls the robot 120 and the hand 140 in a manner in which they insert the distal ends of the pair of claws 141 in the space between the holding recesses 23 of the pair of holding pieces 20 and the outer peripheral surface of the workpiece W, and cause the pair of claws 141 to grasp the workpiece W. Then, the control unit 131 controls the robot 120 and the hand 140 in a manner in which they attach the grasped workpiece W to the device to be made, by insertion or the like. After that, preferably, as shown in FIG. 7, the control unit 131 controls the robot 120 and the hand 140 in a manner in which they bring the pair of holding pieces 20, which have taken off the front workpiece W, into contact with each other.

The case of taking out another workpiece W in FIG. 4 will now be described. The upper end of each workpiece W other than the front one in FIG. 4 is not held by the holding recesses 23 of the corresponding pair of holding pieces 20. Additionally, the outer peripheral surface of the upper end of the workpiece W is exposed at the area where the upward extensions 24 are not provided. Thus, unlike the case of taking out the front workpiece W, the pair of claws 141 can grasp the upper end of the workpiece W without moving the pair of holding pieces 20 in the directions away from each other.

Thus, the control unit 131 controls the robot 120 and the hand 140 in a manner in which the hand 140 brings the pair of claws 141 into contact with the exposed part of the upper end of the workpiece W, and thereby the workpiece W is grasped by the pair of claws 141. Like the case of taking out the front workpiece W, the control unit 131 may also control the robot 120 and the hand 140 in a manner in which they move the pair of holding pieces 20 in the directions away from each other and then cause the pair of claws 141 to grasp the upper end of the workpiece W.

As described, in the present embodiment, each of the pair of holding pieces 20 includes the holding recess 23 and the upward extensions 24 that fit or contact with the outer peripheral surface of a workpiece W inserted between the pair of holding pieces 20 to hold the workpiece W, and the holding recess 23 and the upward extensions 24 prevent the workpiece W from slanting or becoming misaligned when the workpiece holding jig 1 is conveyed in the predetermined direction by the linear guide 110. Thus, as in the present embodiment, providing a plurality of pairs of holding pieces 20 on the base member 10 enables a plurality of workpieces W to be prevented from slanting and becoming misaligned during the conveyance in predetermined direction.

In the case that a low workpiece W is held by a pair of holding pieces 20, the workpiece W being held does not protrude above the top surface of the pair of holding pieces 20. In this state, the hand 140 of the robot 120 cannot pick the workpiece W. However, in the present embodiment, the pair of holding pieces 20 is movable away from each other. Moving the pair of holding pieces 20 away from each other forms a space between the holding pieces 20 and the workpiece W in which the hand 140 of the robot 120 can be inserted. Thus, even if workpieces W with various dimensions are placed, the hand 140 of the robot 120 can pick the placed individual workpieces W.

In this manner, the hand 140 can grasp a workpiece W with no slant or misalignment of the workpieces W on the workpiece holding jig 1 after the linear guide 110 moves the jig at high speed, and thus the hand 140 can attach the workpiece W with high accuracy to a predetermined position of the device to be made, by insertion or the like without regrasping the workpiece W. This is advantageous to efficient manufacturing.

Alternatively, simply one of a pair of holding pieces 20 may move away from the other. Also in this case, the hand 140 of the robot 120 moves one holding piece 20 away from the other holding piece 20, and this movement can form a space between the holding piece 20 and the workpiece W in which the hand 140 of the robot 120 can be inserted. In addition, the hand 140 of the robot 120 may move the workpiece W away from the other holding piece 20 as appropriate, to form a space between this holding piece 20 and the workpiece W.

In the present embodiment, a pair of holding pieces 20 includes the upward extensions 24 extending upward from the top surface. A workpiece W inserted between the pair of holding pieces 20 aligns with the upward extensions 24 in the conveying direction of the linear guide 110, and the upward extensions 24 form a part of a workpiece holding portion that holds a workpiece W.

With a workpiece W protruding significantly above the holding recesses 23, the workpiece W may fall during the conveyance by the linear guide 110. However, in the structure described above, the upward extensions 24 extending upward from the top surface of a holding piece 20 form a part of the workpiece holding portion that holds a workpiece W, and the upward extensions 24 align with the workpiece W inserted between the pair of holding pieces 20 in the conveying direction of the linear guide 110. Thus, even with a workpiece W protruding significantly above the holding recesses 23, the workpiece W is prevented from slanting during the conveyance by the linear guide 110.

In the present embodiment, each holding piece 20 includes the operation portion 22 extending upward from its top surface, and the operation portion 22 is engaged by the claws 141 of the hand 140 when the hand 140 of the robot 120 moves the pair of holding pieces 20 in the directions away from each other. When the pair of claws 141 forces the operation portions 22 of the pair of holding pieces 20 in the directions away from each other, the pair of holding pieces 20 moves away from each other.

In this manner, the operation portion 22, which protrudes upward from the top surface of the piece base 21, allows the hand 140 to easily move the holding piece 20.

The operation portion 22 used by the hand 140 to move the holding piece 20 and the upward extensions 24 functioning as the workpiece holding portion extend upward from the top surface of the piece base 21. Thus, the holding piece 20 may have a lowered center of gravity. In addition, a larger volume of the holding piece 20 may fit in the guide 11. These features are advantageous in preventing the holding pieces 20 in the guides 11 from tilting and becoming misaligned when the workpiece holding jig 1 undergoes great acceleration generated by the linear guide 110 in the conveying direction.

Furthermore, in the present embodiment, the dimension of each holding piece 20 in the conveying direction and the dimension of the corresponding guide 11 in the conveying direction have a small difference, which is 0.2 mm. Thus, even when the workpiece holding jig 1 undergoes great acceleration generated by the linear guide 110 in the conveying direction, the holding pieces 20 in the guides 11 are effectively prevented from tilting and becoming misaligned.

In the present embodiment, the guides 11 that are grooves support the holding pieces 20 in the direction crossing the conveying direction in a movable manner. However, each guide 11 may be, for example, a ridge or a rod extending in the direction crossing the conveying direction, not a groove. In this case, each holding piece 20 may have a groove or a hollow extending in the direction crossing the conveying direction, and the ridge or the rod may fit in the groove or the hollow. This structure also provides the same functional effects as described above.

The present embodiment has the guides 11 that are grooves and the holding pieces 20 that are fitted in the guides 11. This structure is easily produced, and the gaps formed between the holding pieces 20 and the guides 11 are easily adjusted. Thus, the structure is advantageous in facilitating the manufacturing and maintenance of the workpiece holding jig 1. The structure is also advantageous in improving the above-described performance of the workpiece holding jig 1.

Figure 10:
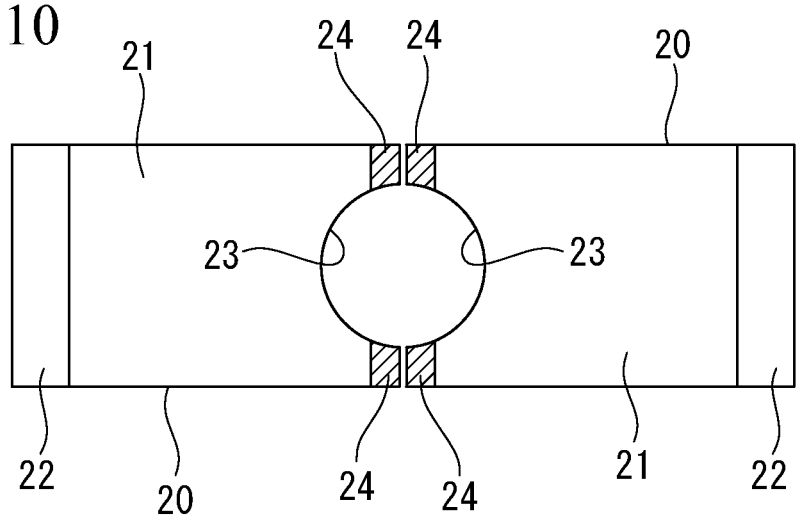
FIG. 10 is a plan view of holding pieces included in the workpiece holding jig according to the first embodiment.
Figure 11:
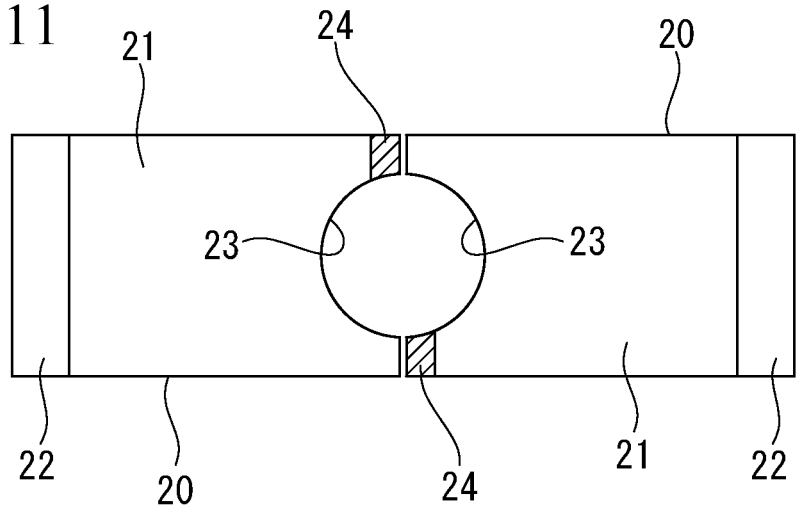
FIG. 11 is a plan view of a first modification of the holding pieces included in the workpiece holding jig according to the first embodiment.
Figure 12:
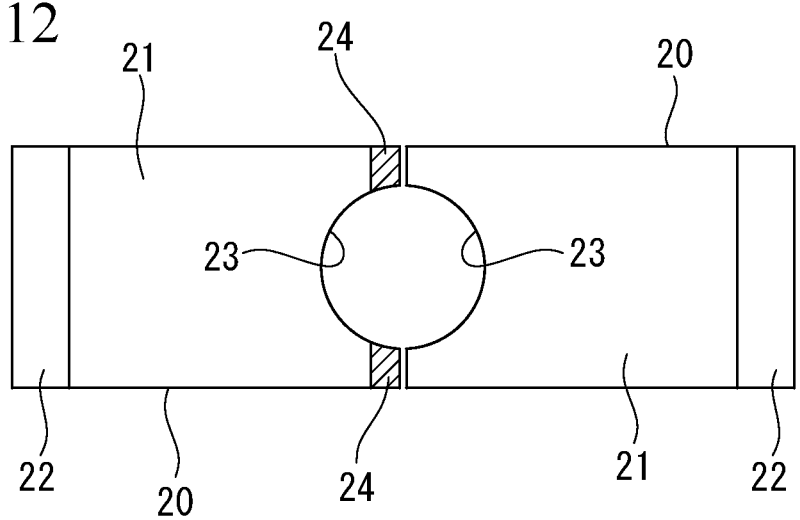
FIG. 12 is a plan view of a second modification of the holding pieces included in the workpiece holding jig according to the first embodiment.
Figure 13:
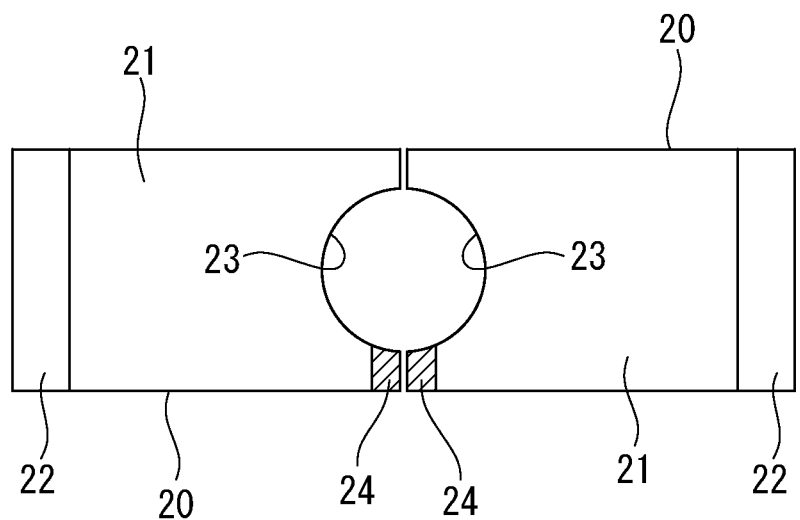
FIG. 13 is a plan view of a third modification of the holding pieces included in the workpiece holding jig according to the first embodiment.

In the present embodiment, as shown in FIG. 10, each holding piece 20 includes a pair of upward extensions 24. However, as shown in FIG. 11, each holding piece 20 may include one upward extension 24. In other cases, as shown in FIG. 12, one of a pair of holding pieces 20 may include a pair of upward extensions 24. Furthermore, for example, in the case that each workpiece W undergoes large inertial force during only one of the acceleration and deceleration of the linear guide 110, the upward extensions 24 may be provided at only one side of the holding recesses 23 in the direction crossing the conveying direction (i.e., the upper or lower side in the drawing), as shown in FIG. 13.

Figure 14:
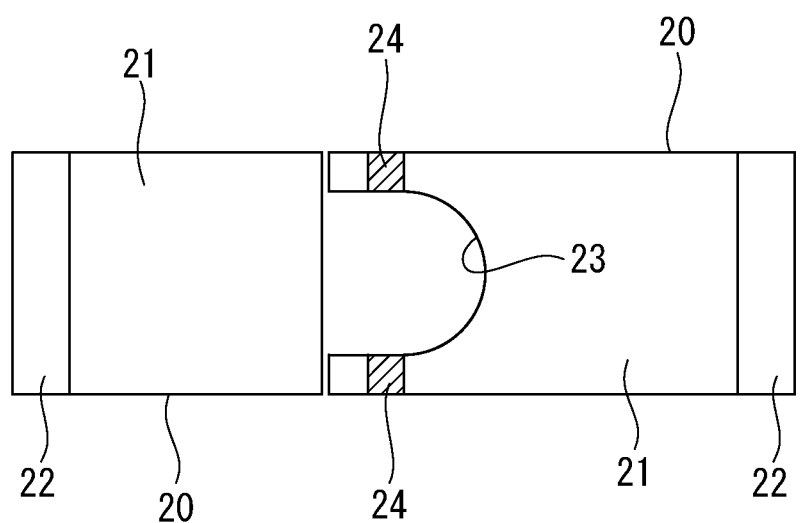
FIG. 14 is a plan view of a fourth modification of the holding pieces included in the workpiece holding jig according to the first embodiment.

As shown in FIG. 14, the holding recess 23 may be formed in only one of a pair of holding pieces 20, and only the holding piece 20 may include the upward extensions 24. In this case, when a workpiece W is inserted between a pair of holding pieces 20 and the tips of the pair of holding pieces 20 come into contact with each other, the holding recess 23 of the one of the holding pieces 20 fits or contacts with the workpiece W, and the distal end of the other holding piece 20 also fits or contacts with the workpiece W. That is, the distal end of the other holding piece 20 functions as a workpiece holding portion. Also in this case, the workpiece holding portion prevents the workpiece W from slanting or becoming misaligned during the conveyance by the linear guide 110.

The upward extensions 24 of each holding piece 20 may be omitted depending on the type or the shape of workpieces W. For example, for workpieces W not protruding above the holding recesses 23, each holding piece 20 may not include the upward extensions 24.

If workpieces W do not fall, the upward extensions 24 may be omitted. In this case, the holding recesses 23 hold a workpiece W to prevent becoming misaligned. Conversely, if workpieces W are not misaligned, the holding recesses 23 hold a workpiece W to prevent slanting.

In the present embodiment, the upward extensions 24 protrude significantly upward from the top surface of the piece base 21 of each holding piece 20. To prevent workpieces W from slanting with the piece base 21 having a lowered center of gravity, the upward extensions 24 are preferably long in the vertical direction. For example, the upward extensions 24 preferably have a length equal to or greater than the thickness of the piece base 21, and the upward extensions 24 more preferably have a length that is 1.5 or more times the thickness of the piece base 21.

In the present embodiment, the direction crossing the conveying direction is the direction orthogonal (or at an angle of 90°) to the conveying direction. However, the direction crossing the conveying direction may be a direction at an angle such as 80° or 70° to the conveying direction as long as each holding piece 20 is prevented from slanting and becoming misaligned during the conveyance by the linear guide 110.

A workpiece holding jig 2 according to a second embodiment of the present invention will now be described with reference to the drawings. The workpiece holding jig 2 according to the second embodiment does not include the guides 11, the holding pieces 20, and the frame member 30 for the workpiece holding jig 1 of the first embodiment. The workpiece holding jig 2 has a plurality of workpiece holding holes 13 formed in the top surface of a base member 10 to hold individual workpieces W. The components which are the same as or similar to those in the first embodiment are labeled with the same reference numerals, and a description thereof will be omitted.

Figure 15:
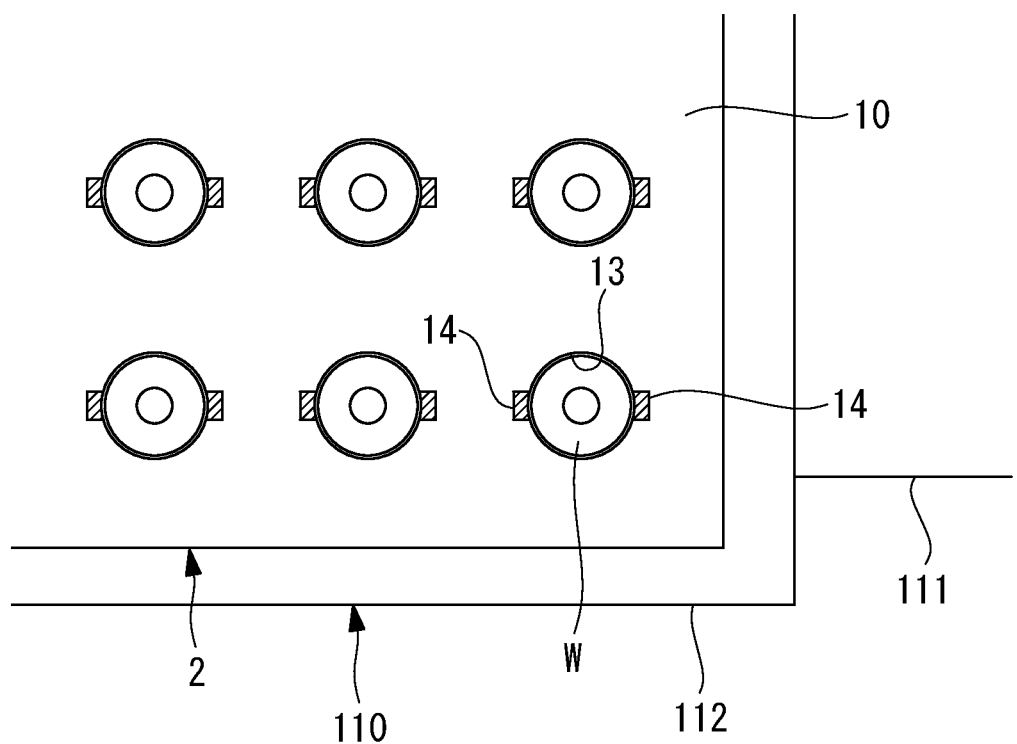
FIG. 15 is a plan view of a main part of a workpiece holding jig according to a second embodiment of the present invention.

The workpiece holding jig 2, as shown in FIG. 15, includes the base member 10 fixed to a slide table 112 and the workpiece holding holes 13 provided in the top surface of the base member 10. The workpiece holding jig 2 also includes a pair of upward extensions 14 provided near each workpiece holding hole 13 and extending upward from the top surface of the base member 10. The pair of upward extensions 14 aligns, in the conveying direction of the linear guide 110, with the workpiece W held by the workpiece holding hole 13. In the present embodiment, a pair of upward extensions 14 also aligns with each other in the conveying direction.

Each workpiece holding hole 13 fits or contacts with the outer peripheral surface of a workpiece W to prevent the workpiece W from slanting and becoming misaligned during the conveyance by the linear guide 110. Each upward extension 14 also fits or contacts with the outer peripheral surface of a workpiece W to prevent the workpiece W from slanting and becoming misaligned during the conveyance by the linear guide 110.

With no upward extensions 14, a workpiece W protruding significantly above the workpiece holding hole 13 might be slanted during the conveyance by the linear guide 110. However, in the present embodiment, the upward extensions 14 extend upward from near the workpiece holding holes 13, and the upward extensions 14 align, in the conveying direction, with the workpiece W held by the adjacent workpiece holding hole 13. Thus, even a workpiece W protruding significantly above the workpiece holding hole 13 is prevented from slanting during the conveyance by the linear guide 110.

While the upward extensions 14 extending upward from near the workpiece holding hole 13 prevent the workpiece W from slanting as described above, the outer peripheral surface of the top side of the workpiece W is exposed at the area where the upward extensions 14 are not provided. The exposed outer peripheral surface of the workpiece W is grasped by the hand 140 of the robot 120, and thereby the workpiece W can be picked by the hand 140 of the robot 120.

To prevent a workpiece W from slanting, each upward extension 14 is preferably long in the vertical direction. To facilitate picking of a workpiece W by the hand 140 of the robot 120, each upward extension 14 is preferably thin. Thus, the vertical length of each upward extension 14 is preferably ¼ or more of the height of a workpiece W, and more preferably ⅓ or more. The dimensions of each upward extension 14 in the conveying direction and the orthogonal direction are preferably 3 mm or less, and more preferably 1.5 mm or less.

Figure 16:
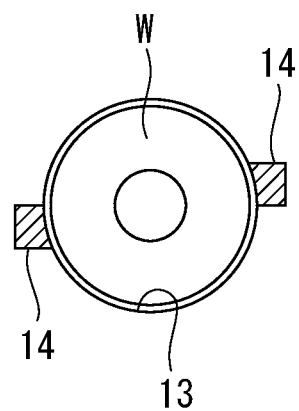
FIG. 16 is a plan view of a main part of the workpiece holding jig according to the second embodiment.

In the second embodiment, as shown in FIG. 16, a pair of upward extensions 14 may not align with each other in the conveying direction. Furthermore, for example, in the case that each workpiece W undergoes large inertial force during only one of the acceleration and deceleration of the linear guide 110, only one of a pair of upward extensions 14 may be provided.

In the first and second embodiments, the slide tables 112 and the workpiece holding jigs 1, 2 may be tilted. For example, the workpiece holding jigs 1, 2 may be tilted with one end higher than the other in the direction orthogonal to the conveying direction. Also in this case, the workpiece holding jigs 1, 2 may be used as described above as long as the jigs can prevent each workpiece W from slanting and becoming misaligned during the conveyance by the linear guide 110.

In the first and second embodiments, the linear guide 110 may be replaced with another conveyor. Also in this case, the workpiece holding jigs 1, 2 can prevent the workpieces W from slanting and becoming misaligned during the conveyance by the conveyor, and the hand 140 can pick the workpieces W arranged in the workpiece holding jigs 1, 2.

Although cylindrical workpieces W are placed on the workpiece holding jigs 1, 2 in the first and second embodiments, workpieces W to be placed may have other shapes or types. In such a case, the workpiece holding holes 13, the holding recesses 23, and the upward extensions 14, 24 may be modified in shape in accordance with the shape or the type of the workpieces W.

The following aspects of the present invention are derived from the above disclosure.

A first aspect of the present invention is a workpiece holding jig conveyed by a conveyor in a predetermined direction, the workpiece holding jig comprising: a base member; and a pair of holding pieces arranged on the base member in a direction crossing the predetermined direction, wherein each of the pair of holding pieces includes a workpiece holding portion that fits or contacts with an outer peripheral surface of a workpiece located between the pair of holding pieces to prevent the workpiece from slanting or becoming misaligned during conveyance in the predetermined direction, and at least one of the pair of holding pieces is movable in a direction away from the other.

In this aspect, each of the pair of holding pieces includes the workpiece holding portion that fits or contacts with the outer peripheral surface of the workpiece located between the pair of holding pieces to hold the workpiece. The workpiece holding portion prevents the workpiece from slanting or becoming misaligned when the workpiece holding jig is conveyed in the predetermined direction by the conveyor. Thus, for example, a plurality of pairs of holding pieces can be provided on the base member to hold a plurality of workpieces in a manner where the holding pieces prevent slanting or becoming misaligned during the conveyance in the predetermined direction.

In the case that a low workpiece is held by the pair of holding pieces, the workpiece being held does not protrude above the upper surface of the pair of holding pieces. In this state, the robot hand cannot pick the workpiece. However, in this aspect, at least one of the pair of holding pieces is movable in the direction away from the other. Moving at least one of the pair of holding pieces in this manner forms a space between the holding pieces and the workpiece in which the robot hand can be inserted. Thus, even if workpieces with various dimensions are placed, the robot hand can pick the placed individual workpieces.

In the above aspect, preferably, at least one of the pair of holding pieces includes an upward extension portion extending upward from an upper surface thereof, and the upward extension portion aligns, in the predetermined direction, with the workpiece located between the pair of holding pieces and forms a part of the workpiece holding portion.

With a workpiece protruding significantly above the upper surface of the holding pieces, the workpiece may be slanted during the conveyance by the conveyor. However, in this aspect, the upward extension portion extending upward from the upper surface of the holding piece forms a part of the workpiece holding portion that holds a workpiece, and the upward extension portion aligns with the workpiece located between the pair of holding pieces in the predetermined direction. Thus, even with a workpiece protruding significantly above the upper surface of the holding piece, the workpiece is prevented from slanting during the conveyance by the conveyor.

In the above aspect, preferably, the at least one of the holding pieces includes an operation portion extending upward from an upper surface thereof, and when the at least one of the holding pieces is to be moved in the direction away from the other by a robot hand, the operation portion has contact with the robot hand so that the at least one of the holding pieces is made to move in the direction away from the other. In this manner, the operation portion, which protrudes upward from the upper surface of the holding piece, allows the hand to easily move the holding piece.

A second aspect of the present invention is a workpiece holding jig conveyed by a conveyor in a predetermined direction, the workpiece holding jig comprising: a base member; a workpiece holding hole provided in the base member; and an upward extension portion extending upward from near the workpiece holding hole, wherein the upward extension portion align, in the predetermined direction, with a workpiece held by the workpiece holding hole, and the workpiece holding hole and the upward extension fit or contact with an outer peripheral surface of the held workpiece to prevent the workpiece from slanting or becoming misaligned during conveyance in the predetermined direction.

In this aspect, the workpiece holding hole and the upward extension portion provided to fit or contact with the outer peripheral surface of a workpiece prevent the workpiece from slanting or becoming misaligned when the workpiece holding jig is conveyed in the predetermined direction by the conveyor. Thus, for example, a plurality of holding holes and a plurality of upward extension portions provided in and on the base member enable a plurality of workpieces to be held in a manner where they prevents the workpieces from slanting or becoming misaligned during the conveyance in the predetermined direction.

With no upward extension portions, a workpiece protruding significantly above the workpiece holding hole might be slanted during the conveyance in the predetermined direction. However, in this aspect, the upward extension portions extend upward from near the workpiece holding hole, and the upward extension portions align in the predetermined direction with the workpiece held by the workpiece holding hole. Thus, even a workpiece protruding significantly above the workpiece holding hole is prevented from slanting during the conveyance in the predetermined direction.

While the upward extension portion extending upward from near the workpiece holding hole prevents the workpiece from slanting as described above, the outer peripheral surface of the workpiece is exposed at the area where the upward extension portion is not provided. The exposed outer peripheral surface of the workpiece is grasped by the robot hand, and thereby the workpiece can be picked out by the robot hand.

The above aspects allow a plurality of workpieces with various dimensions to be arranged in a manner where the workpieces are prevented from slanting or becoming misaligned, and the arranged individual workpieces can be picked by a robot hand.

REFERENCE SIGNS LIST 1, 2 workpiece holding jig
10 base member
11 guide
13 workpiece holding hole
14 upward extension
20 holding piece
21 piece base
22 operation portion
23 holding recess (workpiece holding portion)
24 upward extension (workpiece holding portion)
30 frame member
31 frame body
32 beam member
100 manufacturing system
110 linear guide (conveyor)
111 rail
112 slide table
120 robot
121 servomotor
130 control apparatus
131 control unit
140 hand
141 claw
142 driving unit
150 visual sensor
W workpiece

The invention claimed is:

1. A workpiece holding jig conveyed by a conveyor in a predetermined direction and coupled to a driving mechanism of the conveyor, the workpiece holding jig comprising:
 a base member; and
 at least one pair of holding pieces arranged on the base member in a direction crossing the predetermined direction,
 wherein each pair of holding pieces includes a workpiece holding portion comprising a recess defined between the pair of holding pieces, a first holding piece in the pair of holding pieces having a first concave portion facing a second concave portion of a second holding piece in the pair of holding pieces, wherein said workpiece holding portion fits or contacts with an outer peripheral surface of a workpiece located between the pair of holding pieces to prevent the workpiece from slanting or becoming misaligned during conveyance in the predetermined direction,
 wherein at least one of the pair of holding pieces is movable in a direction away from the other,
 wherein at least one pair of holding pieces includes an upward extension portion extending upward from an upper surface thereof, and
 wherein the upward extension portion aligns, in the predetermined direction, with the workpiece located between the pair of holding pieces and forms a part of the workpiece holding portion.

2. A workpiece holding jig conveyed by a conveyor in a predetermined direction and coupled to a driving mechanism of the conveyor, the workpiece holding jig comprising:
- a base member; and
- at least one pair of holding pieces arranged on the base member in a direction crossing the predetermined direction,
- wherein each pair of holding pieces includes a workpiece holding portion comprising a recess defined between the pair of holding pieces, a first holding piece in the pair of holding pieces having a first concave portion facing a second concave portion of a second holding piece in the pair of holding pieces, wherein said workpiece holding portion fits or contacts with an outer peripheral surface of a workpiece located between the pair of holding pieces to prevent the workpiece from slanting or becoming misaligned during conveyance in the predetermined direction,
- wherein at least one of the pair of holding pieces is movable in a direction away from the other,
- wherein at least one of the holding pieces in the at least one pair of holding pieces includes an operation portion extending upward from an upper surface thereof, and
- when the at least one of the holding pieces is to be moved in the direction away from the other by a robot hand, the operation portion has contact with the robot hand so that the at least one of the holding pieces is made to move in the direction away from the other.

3. A workpiece holding jig conveyed by a conveyor in a predetermined direction and coupled to a driving mechanism of the conveyor, the workpiece holding jig comprising:
- a base member;
- a workpiece holding hole structure provided in the base member, said workpiece holding hole structure defining a recess within an inner perimeter of the workpiece holding hole structure; and
- an upward extension portion extending upward from near the workpiece holding hole structure, the upward extension portion comprising a pair of upward extensions disposed on an outer perimeter of the workpiece holding hole structure,
- wherein the upward extension portion aligns, in the predetermined direction, with a workpiece held by the workpiece holding hole structure, and
- the workpiece holding hole structure and the upward extension fit or contact with an outer peripheral surface of the held workpiece to prevent the workpiece from slanting or becoming misaligned during conveyance in the predetermined direction.

4. The workpiece holding jig of claim 3, wherein the pair of upward extensions terminate in a pair of exposed tips configured to interface with the workpiece.

* * * * *